June 9, 1970 H. B. CHAMBERS ET AL Re. 26,905

HYDRAULIC GRIPPER FOR DERRICK JACK

Original Filed Feb. 1, 1966

INVENTORS
HENRY B. CHAMBERS
CLAIR W. TELLEFSON

BY H. W. Bredford
ATTORNEY

United States Patent Office

Re. 26,905
Reissued June 9, 1970

26,905

HYDRAULIC GRIPPER FOR DERRICK JACK

Henry B. Chambers and Clair W. Tellefson, Santa Barbara, Calif., assignors to Hydranautics, Santa Barbara, Calif., a corporation of California Original No. 3,373,971, dated Mar. 19, 1968, Ser. No. 524,041, Feb. 1, 1966. Application for reissue May 6, 1968, Ser. No. 730,210

Int. Cl. B66f *1/00*

U.S. Cl. 254—106 13 Claims

Matter enclosed in heavy brackets [ ] appears in the original patent but forms no part of this reissue specification; matter printed in italics indicates the additions made by reissue.

ABSTRACT OF THE DISCLOSURE

A double flanged member such as an I beam is gripped by a pair of smooth jaws on one side of the flanges and by a smooth shoe or shoes on the other side of the flanges, and the shoe and jaws are mechanically interconnected to move together longitudinally but with a universal motion to fit irregularities of the flanged member. A hydraulic motor moves the shoe toward the jaws. The gripper acts as an anchor for pulling or pushing heavy objects supported on the I beam.

This invention relates to fluid powered gripping mechanisms and has particular reference to a powerful gripper that does not deform or injure the member being gripped.

The invention will be described as applied to a weight moving mechanism of the type wherein oil well derricks are mounted on a pair of heavy steel I beams or H beams that are parallel. The oil derrick is skidded along these beams to place it over one of a number of oil well positions between the beams. The weights of the oil derricks or rigs are great, and correspondingly high gripping forces must be employed. In one embodiment of the invention a gripping force on the order of 1000 tons is developed and permits a ring moving force of 135 tons. A gripper on each steel beam frictionally engages its beam and hydraulic (or other) motors interconnect the gripper and the derricks. The motors will either push the oil derrick away from the grippers or pull it towards the grippers and when the motors have reached the end of their stroke the gripper will be released and moved by the motors to a new gripping location on the steel beam. The gripper will again be actuated to grip the steel beam and the motors are again operated to move the rig. In this fashion the grippers and oil derrick alternately "walk" along the steel beams, thereby effecting movement of the oil derrick.

The gripper construction must not damage the steel I beams as otherwise the beams become too rough to act as a skidding support for the oil derrick. This requirement rules out any gouging or digging into the beam. Instead, engagement must be accomplished by plain pressure in order to obtain the necessary frictional engagement between the gripper and the steel beam. Furthermore, the gripper must accommodate to uneven surfaces on the steel I beam or H beam. While such beams are relatively smooth when they are rolled in the steel mill, they are not machined to an exact surface. There are frequently small areas of unevenness and the gripping mechanism must accommodate to such non-flat areas in order to develop the very high gripping forces. Also there must be sufficient area of contact between the gripper and the steel beam so that the beam will not be deformed.

It is, therefore, a general object of the invention to provide an improved gripper.

Another object is to provide a gripper that does not scar or damage the member being gripped.

Still a further object is to provide a power activated gripper that can move from one gripping position to another.

A further object of the invention is to provide a gripper and motor combination for moving heavy objects that walks along a gripped surface alternatively with the object being moved.

It is a feature of the invention that the mechanism embodying it may be expanded to remove it from a flanged surface without disassembly.

Other objects, advantages and features of the invention will be apparent in the following specification including the drawing wherein.

Figure 1:
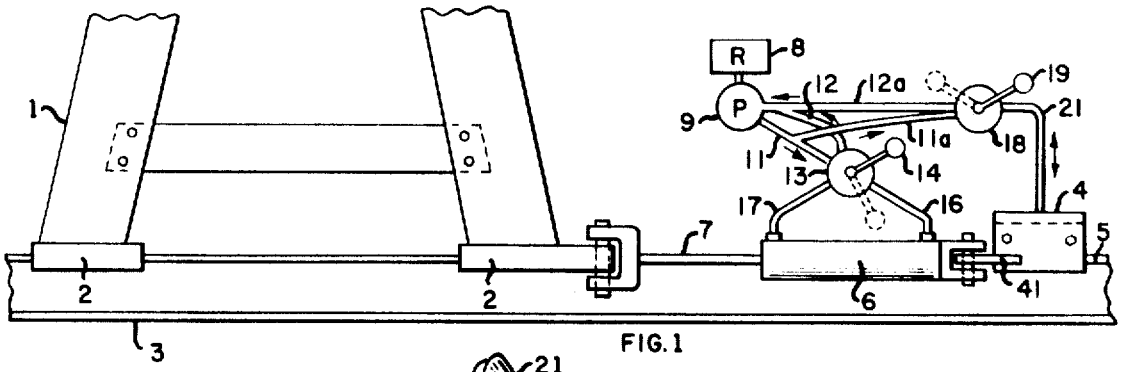
FIG. 1 is a schematic elevation view of an oil well derrick mounted for skidding on a pair of I beams (only one shown) together with a gripper and hydraulic motor embodiying the invention for skidding the oil derricks on the I beam in either direction.

Referring to FIG. 1 of the drawing, an oil derrick 1 is supported on an I beam 3 by means of bearing plates 2. It will be appreciated that oil derricks are usually four legged and that the other two legs similarly are supported by a parallel I beam (not shown). A gripper 4 embodying the invention engages the top flange 5 of the I beam 3 and a hydraulic motor interconnects the gripper 4 and one of the bearing shoes 2 of the oil derrick 1. The hydraulic motor has a cylinder 6 connected to the gripper 4 and has a piston rod 7 connected to one of the bearing plates 2. The gripper is actuated by fluid under pressure whereupon it compresses tightly on the I beam flange 5 forming a secure anchor against which the hydraulic motor 6–7 can act to push or pull the derrick 1.

The hydraulic motor 6–7 and the gripper 4 are supplied with fluid from a reservoir 8 which feeds into a pump 9 having an outlet line 11 and an inlet line 12. These lines lead to a double acting valve 13 controlled by a handle 14. In the position shown for the handle 14 the valve delivers fluid under pressure into a conduit 16 connected to one end of motor 6 and connects the other end of motor 6 to exhaust thru a conduit 17. The extends the piston rod 7 to the left in FIG. 1. If the handle 14 is rotated to the position shown in broken outline the pressure and exhaust are reversed and the piston rod 7 moves to the right in FIG. 1.

The gripper is independently operated by a valve 18 having a handle 19 that connects the gripper 4 to pressure or exhaust. This is accomplished by a branch pressure line 11a and a branch exhaust line 12a and a conduit 21 leading from the valve 18 to the gripper 4. When the valve handle 19 is in the position shown fluid under pressure is delivered to the gripper 4 and it tightly engages the flange 5. When the handle 19 is rotated to the position shown in broken outline the gripper 4 is connected to exhaust and it releases its grip on flange 5 and the entire gripper 4 may be slid along the I beam 3.

It will be appreciated that the mechanism of FIG. 1 uses two motors 6–7 and only one is shown for convenience. The valve 13 services both motors 6–7. Also it will be appreciated, as mentioned earlier, that the other two legs of derrick 1 rest on a similar I beam and a duplicate mechanism as shown in FIG. 1 is used for these other two legs. The centerline of cylinder 6 and piston rod 7 are in the plane of the flange 5 insuring that no canting or crimping action will be imparted to the gripper.

The operation of the device of FIG. 1 will be described at this point inasmuch as it will assist in the description of the remaining figures of the drawings. The pump 9 is actuated, causing fluid to flow to the gripper 4 thru conduit 21 whereupon the gripper securely fastens itself on to flange 5. Fluid flows to the right hand end of cylinder 6, forcing the piston rod 6 to the left, moving the entire derrick 1 to the left. When the piston rod 6 has reached the end of its stroke, handle 19 of valve 18 is rotated to the left, connecting the gripper to exhaust whereupon it releases its grip on flange 5. The valve handle 14 of valves 13 is rotated clockwise, connecting the left end of cylinder 6 to pressure, causing the cylinder to move to the left, and in turn dragging gripper 4 with it. When this stroke is finished, the gripper is again energized by valve 18 and the stroke of piston-cylinder 7–6 is reversed, again moving the derrick to the left. In this fashion the gripper 4 and derrick alternately "walk" along the I beam 3 until the oil derrick 1 is accurately positioned over the desired oil well for whatever operation is desired. In the same fashion the derrick and gripper can "walk" to the right.

Referring now to FIGS. 2 thru 5 the gripper 4 has a pair of side plates 22 each having a jaw 23 projecting toward the other plate to engage the underside of the flange 5 of the I beam 3. A similar upper projection 24 on each side plate 22 engages the top of a cylinder housing 26 having a cylindrical recess 27 opening toward the flatted top 5a of the I beam 3. A port 28 communicates the interior of the cylindrical recess to the exterior of the cylinder housing and conduit 21 is connected to this port 28. A thin piston 29 is fitted into the recess 27 and is sealed by an O ring fitted into a circumferential groove 31. The piston is preferably a spherical segment of radius R having its center on the plane of the groove 31. The radius R is not less than ½ of the diameter, and this spherical outer circumference of the piston 29 combined with its thinness relative to diameter permits it to assume various angles other than a right angle to its axis to accommodate uneveness in the flat surface 5a of the I beam 3. Disposed between the piston 29 and the I beam 3 is a flat shoe member 32 which frictionally engages the flat surface 5a of the I beam 3.

The shoe is provided to insulate the piston 29 from loads placed on the gripper 4 in a direction parallel to the plane of the piston 29. If such a load is placed on the piston, which occurs when the piston 29 is in direct contact with the I beam 3, the load is transmitted to the walls of the cylinder 27 and denting and scoring result. The present invention connects the shoe to the side plates 22 with a universal joint which also includes movement of the shoe toward and away from the I beam 3 in response to pressure from the piston 29, or the absence of pressure. This universal connection transmits the frictional engagement pressures to the side plates and takes these forces off of the piston 29 so that there is no scoring or denting of walls of the cylinder 27. The shoe 32 gives high pressure contact on the I beam in the areas opposite to the jaws 23. The center of shoe 32 sees no significant load.

The universal connection of shoe to side plates is provided particularly in accordance with the invention and takes the form of a pair of trunnion pins 33 having square heads 34 which fit fairly precisely in vertical slots 36 in the shoe 32. While the trunnions could be formed on the shoe 32 to project into slots in the side plates 22, it is presently preferred to have the pins supported by the side plates 22. The pins 33 accordingly fit fairly precisely in bores 35 in the side plates 22 and the pins rotate therein as the shoe 32 cocks from one angle to another. The slots 36 not only accommodate translation of the shoe toward and away from the I beam 3, but in addition allows one side of the shoe to be higher or lower than the other to accommodate unevenness of the flatted top 5a of the I beam 3. The trunnion pins and slots thus provide a true universal joint or connection. The square trunnion heads 34 offer a large bearing surface to the shoe 32 thus transmitting extremely high stresses to the side plates 22. The cumulative tolerances for the slot and trunnion construction is less than that of the piston and cylinder to avoid scoring the cylinder walls.

Figure 2:
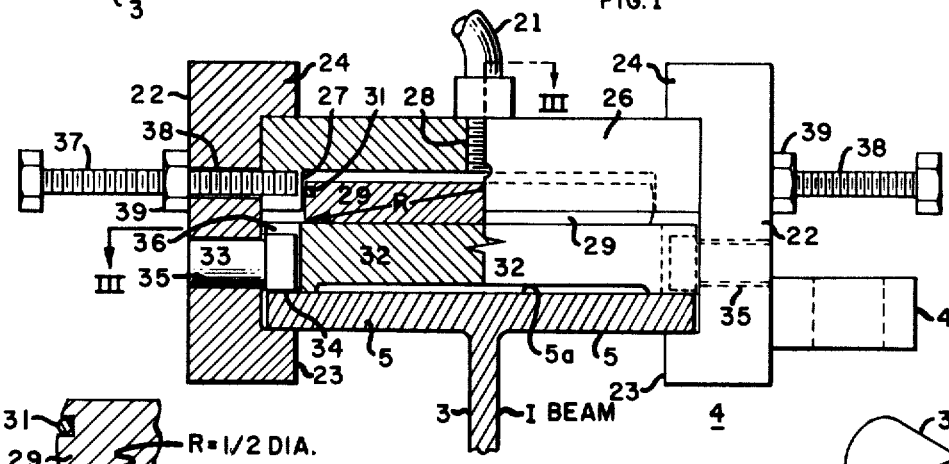
FIG. 2 is a view in vertical one-half section thru the gripper mechanism of FIG. 1 showing it engaging an I beam.
Figure 4:
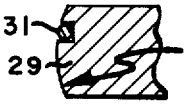
FIG. 4 is an enlarged fragmentary sectional detail of the gripper piston of FIG. 2.
Figure 5:
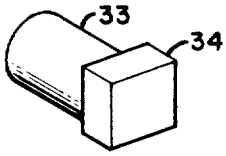
FIG. 5 is an enlarged isometric view of one of the trunnion pins of FIGS. 2 and 3.
Figure 3:
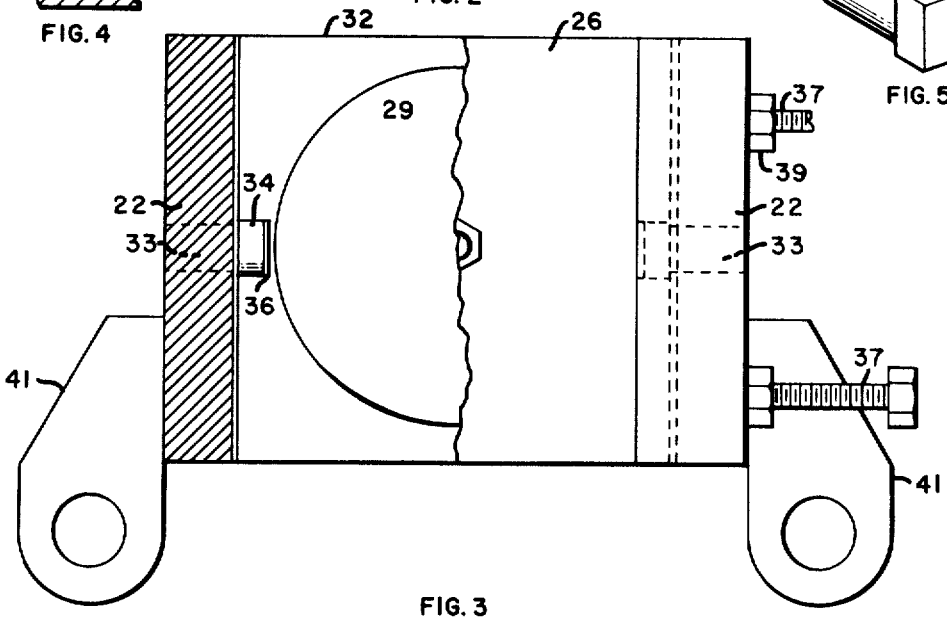
FIG. 3 is a view in horizontal one-half section along the line III—III of FIG. 2 showing the gripper piston resting on top of the shoe with one half of the gripper cylinder cut away.

The entire assembly of the gripper 4 is held together by fasteners that have an alternate lost motion operation that permits spreading the side plates 22 to release the jaws 23 from the flange 5 without actual disassembly. This fastening takes the form of bolts 37 passing thru smooth bores 38 in the side plates 22 and threaded into the cylinder housing or cylinder block 26. A nut 39 on each bolt 37 is threaded tight against the side plates 22 to hold the assembly together as shown in FIG. 2. To spread the side plates, these nuts 39 are rotated toward the nut head an amount sufficient to spread the side plates so that the jaws 23 clear the flange 5 whereupon the entire gripper assembly can be removed upwardly. This is frequently preferable to sliding the gripper off of the end of the I beam 3.

Forces are applied to the gripper 4 thru apertured ears 41, and as shown in FIG. 1, this is the point of connection of the hydraulic motor 6–7. As shown most clearly in FIG. 2, these ears 41 are disposed in the plane of the I beam flange 5. For this reason there is no canting or cocking of the gripper 4 under stress, and then there is no tendency for the gripper to dig into the steel I beam.

Total piston travel is measured in fractions of an inch, and travel at high pressure (above 1000 p.s.i.) is measured in thousandths of an inch. For this reason it is practical to use very high hydraulic pressures reliably and pressures on the order of 10,000 pounds per square inch are used in practice. The area of the jaws 23 must necessarily be such that with the total pressure applied the elastic limit of the steel I beam will not be exceeded. This avoids deformation of the flange 5.

The invention has been described with respect to a specific embodiment thereof, but it will be appreciated by those skilled in the art that various modifications can be made. For example, different interconnections of the side plates and shoe are readily apparent. Various geometric configurations of side plates cylinder and gripper jaws are possible. Further, the gripper and the motors can be hydraulically interlocked so that the gripper and motors sequence automatically. For these and various other reasons the invention and the claims are not limited to the specific embodiment shown, but cover all variations and modifications that fall within the true spirit and scope of the invention.

What is claimed is:

1. A gripper mechanism for engaging a flatted flanged member comprising:

(a) a pair of side plates each having a jaw projecting toward the other plate to engage a flange on the member;

(b) a spacer secured between the side plates at a place removed from the jaws and having a motor cavity on a side toward the jaws and a port communicating with the cavity;

(c) a piston placed in the motor cavity of the spacer for movement toward and away from the jaws;

(d) a shoe member disposed between the jaws and the piston to rest on the flat of the member;

(e) and a slot and trunnion connection between the side plates and the shoe with the slot extending generally in the direction of piston movement, whereby the shoe can move in response to piston movement with a universal movement to accommodate unevenness of the flatted surface.

2. A gripper mechanism as set forth in claim 1 wherein the motor cavity is cylindrical, the piston is round and the piston has an engagement surface with the cylinder cavity that is a spherical segment with a radius that is approximately not less than one-half the piston diameter.

3. A gripper mechanism as set forth in claim 1 wherein fasteners are used to secure the spacer to the side plates and these fasteners have an alternate lost motion action permitting spreading of the side plates so that the jaws clear the flange to permit transverse removal of the gripper.

4. In combination with a heavy object and an elongated flatted and flanged member on which it is supported for movement thereon;

(a) a pair of spaced side plates each having a jaw projecting toward the other plate to engage a flange on the member;

(b) a shoe moveably connected to each side plate;

(c) a gripper fluid motor connected to the side plates to press the shoe toward the jaws and thereby press the flanges of the member against the jaws to frictionally engage them;

(d) a fluid motor interconnecting the heavy object and the side plates;

(e) and controls for the two fluid motors for alternately activating the interconnecting motor in one direction when the gripper motor is energized and activating it in the opposite direction when the gripper motor is de-energized, to thereby move the object along the flatted and flanged member.

5. The combination as set forth in claim 4 wherein the interconnecting motor has points of connection with the side plates and the object substantially in the plane of the flat of the member.

6. A gripper mechanism for engaging a flanged member comprising:

(a) a pair of spaced side plates each having a jaw projecting toward the other plate to engage a flange on the member;

(b) a shoe movably connected to the two side plates[;], *adaptable for frictionally engaging said flange between said shoe and side plates when said shoe is forceably moved toward said flange but allowing said flange to move between said jaws and shoe when said shoe is not forceably engaging said flange; and*

(c)[and] a gripper fluid motor connected to the side plates [to press the] *for selectively forcing said* shoe toward [the] *said* jaws [and] thereby [press the flanges of the member against the jaws to frictionally engage them.] *frictionally engaging said flange between said shoe and jaws.*

7. A gripper mechanism as set forth in claim 6 wherein the connection of the shoe to the side plates is a universal connection.

8. A gripper mechanism as set forth in claim 6 wherein a pair of trunnions engage slots to interconnect the shoe and side plates and to thereby give universal movement of the shoe with respect to the side plates.

*9. A device for walking a heavy structure along a first surface of a flanged member comprising:*

*(a) a gripper including means for selectively gripping said first surface of said flange and the opposite surface of said first surface without deforming said flange; and*

*(b) a motor means coupling said gripper with said heavy structure for moving said heavy structure relative to said gripper on said first surface of said flange when said gripper is frictionally engaging said flange.*

*10. The device defined in claim 9 wherein said gripper is fluid operated.*

*11. The device defined in claim 10 wherein said gripper includes a cylinder.*

*12. The device defined in claim 11 wherein said gripper includes a piston and a shoe coupled to said piston for enabling the gripping of said flange.*

*13. A device for walking a heavy structure along a flange member comprising:*

*(a) a gripper comprising a pair of spaced side plates each having a jaw projecting toward the other plate to engage a flange on the member;*

*(b) a shoe connected to the two side plates;*

*(c) a gripper fluid motor connected to the side plates to relatively move the shoe and the jaws and thereby press the flanges of the flange member between the jaws and the shoe to frictionally engage them; and*

*(d) a motor means coupling said gripper with said heavy structure for moving said heavy structure relative to said gripper along said flange member when said gripper is frictionally engaging said flange member.*

References Cited

The following references, cited by the Examiner, are of record in the patented file of this patent or the original patent.

UNITED STATES PATENTS

| | | | |
|---|---|---|---|
| 965,807 | 7/1910 | Garvey | 269—23 X |
| 2,931,657 | 12/1945 | Tavelin. | |
| 2,621,892 | 12/1942 | Kilness | 254—35 |
| 3,033,525 | 5/1962 | Johnson | 254—107 |
| 3,269,705 | 8/1966 | Heathcote et al. | 254—106 X |

ROBERT C. RIORDON, Primary Examiner

D. R. MELTON, Assistant Examiner